Figure 1:
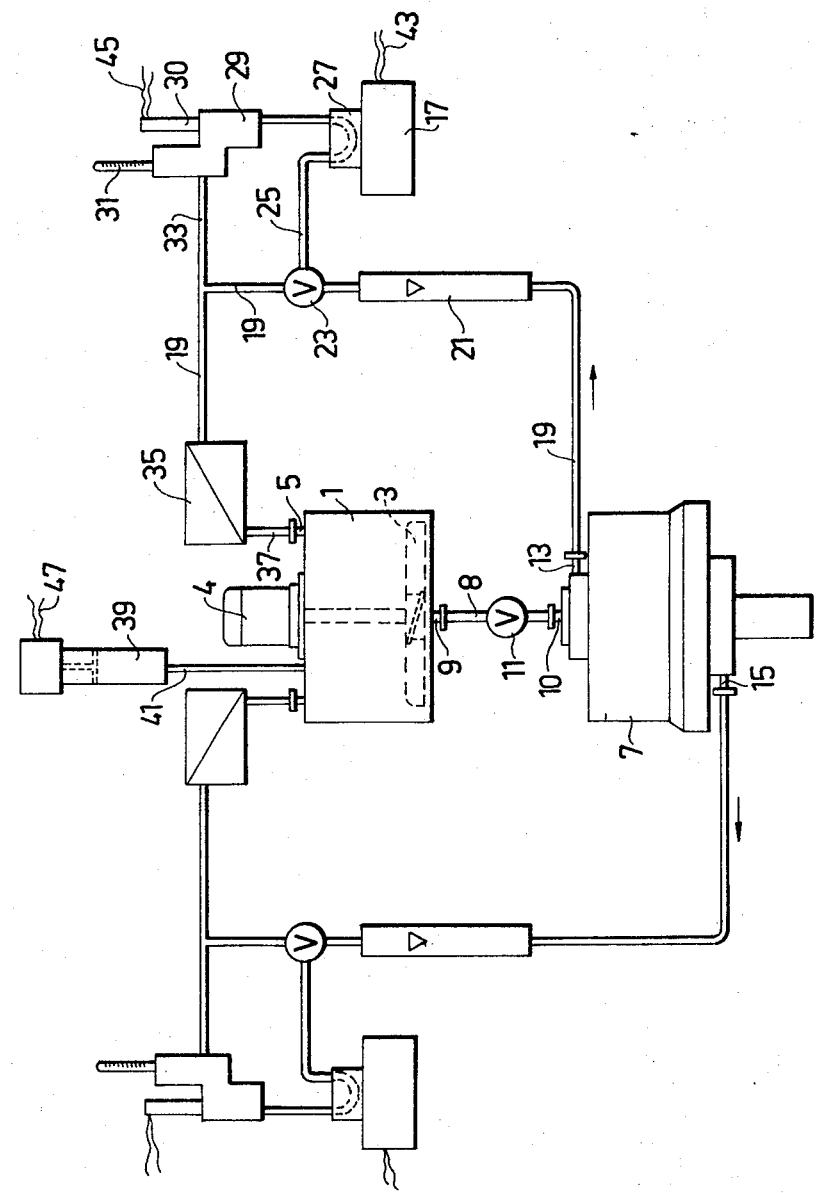

United States Patent

[11] 3,615,227

[72] Inventors  Helge Jan Arnold Rydberg
 Molndal;
 Hans Reinhardt, Goteborg, both of Sweden
[21] Appl. No. 824,370
[22] Filed May 5, 1969
[45] Patented Oct. 26, 1971
[73] Assignee Incentive AB
 Stockholm, Sweden
[32] Priority Dec. 16, 1965
[33] Sweden
[31] 16308/65
 Continuation of application Ser. No.
 601,183, Dec. 12, 1966, now abandoned.

[54] METHOD FOR THE DETERMINATION OF DISTRIBUTION FACTORS
 3 Claims, 3 Drawing Figs.
[52] U.S. Cl. ............................................. 23/230,
 23/253, 23/267, 210/83
[51] Int. Cl. ....................................... B01d 11/04,
 G01n 27/56
[50] Field of Search .......................... 23/253,
 230, 253 A, 230 A, 230 R; 210/83

[56] References Cited
 UNITED STATES PATENTS
 3,421,855 1/1969 Kateman et al. ............... 23/230
 3,114,609 12/1963 Jones ............................ 23/230
 OTHER REFERENCES
 Mazur et al., Anal. Chem. 5, Nov. 15, 1933, p. 419
 Zucal et al., Anal. Chem. 35, 08, July 1963, pp. 988– 991
 Latimer, G. W. Jr., Anal. Chem. 35, 012, Nov. 1963, p. 1983

Primary Examiner—Morris O. Wolk
Assistant Examiner—R. M. Reese
Attorney—Jones and Lockwood ABSTRACT: A method for investigating and controlling a two-phase liquid system, and for determining the partition factor of a substance between two substantially immiscible liquids. The liquids are intimately mixed in a mixing zone in the presence of the substance to be tested, said substance being introduced therein in any suitable manner. The liquids are separated into their two phases, the separator having one outlet for each phase. The individual phases are conducted to corresponding testing stations where the concentration of said substance in each phase is measured.

METHOD FOR THE DETERMINATION OF DISTRIBUTION FACTORS

This application is a continuation of application Ser. No. 601,183, filed Dec. 12, 1966, and now abandoned.

This invention relates to the determination of the distribution of a soluble substance between two immiscible or only sparingly miscible liquids in a two-phase liquid system, and especially to the determination of the distribution or partition factor of a substance in such system. The determination of the concentration of a substance in both of the phases in such a system is desired, or even compulsory, in not only purely fundamental research and technological investigation but also in applied chemistry and industrial production, especially in the extraction industry, such as metal recovery in hydrometallurgical processing and extraction of pharmaceutically active substances from, for instance, microbiological broths. Numerous examples of applications are generally known and can be found in literature. The object of determining the distribution varies from studying the influence on the partition factor of the chemical and physical conditions of operation, such as the presence of certain chemicals, pH, red-ox state, temperature, etc., to the control of industrial extraction processes. Thus, it is often an object to find the partition factor as a function of the chemical composition and physical state of the two solvents forming the liquid phases. This may be for the purpose of detecting the composition and properties of a substance, or finding out suitable systems and operating conditions in analytical and preparative chemistry, or again to find optimum conditions for solvent extraction processes used in industry.

The conventional technique for determining the partition factor as a function of chemical and physical parameters is to carry out test tube experiments, and hundreds of such experiments or tests may be required for each system to be investigated. Moreover, for obtaining accurate values of distribution the phases must be completely separated from one another, which is often difficult and sometimes impossible to attain within reasonable time or at reasonable costs.

It is the object of the invention to provide means for determining the partition factor of a substance between two intimately mixed liquid phases in an accurate and rapid way and so that the determination can be carried out continuously. It is a second object to provide such means that the determination can be performed near by the place of processing.

For obtaining these objects and other valuable advantages the inventors have provided an apparatus for investigating and controlling a two-phase liquid system generally comprising a mixture vessel for two at the most sparingly miscible liquids to be intimately mixed and provided with an intake for material to be treated therein and outlet for the mixed liquids; a separating device capable of completely, continuously and rapidly separating the two phases of a two-phase liquid system and provided with inlet for a liquid two-phase mixture and separate outlets for liquid phases separated therein; a conduit connecting the outlet of said vessel with the inlet of said separating device; detector means connected to each of said outlets for liquid phases for measuring the concentration of a selected substance contained in each of said phases.

For more scientific or laboratory investigations and researches the mixture vessel may be an agitator containing the bulk of the liquids to be studied. The mixture vessel may, however, represent a reactor or extractor or the like, such as the mixer or the conduit between the mixer and the settler in a unit of a conventional mixer-settler arrangement or battery, as used, for instance, in the recovery of metals (such as copper) from a leach liquor by extraction with an organic solvent, such as kerosene, and stripping the so-obtained organic phase with an aqueous liquid, such as a sulfuric acid solution. The extraction as well as the stripping may be conducted in one or more steps, and phase concentration may be checked and controlled for one or both phases in one or more of the steps. Preferably an apparatus according to the invention is attached to each step to be controlled, but under circumstances one apparatus can be used for more steps alternatingly by providing branch conduits to the pertinent steps, and, if desired, rinsing the apparatus between the examinations of individual steps, which can be performed by passing the test liquid through the apparatus for a while before the detection is started.

In either of the cases referred to above it may be advantageous to use an apparatus comprising a liquid-recycling conduit connecting said separate outlet of the separating device with said vessel, said detector means being connected to said recycling conduit, either as a part thereof or preferably in a branch conduit.

The separating device is with great advantage a centrifugal separator according to copending application Ser. No. 601,526, entitled Centrifuge for Complete Phase Separation of Two Liquids, now U.S. Pat. No. 3,442,445, issued MaY 6, 1969 to the inventors of the present application, but may, as a principle, be any kind of separator by which a complete, continuous and rapid phase separation can be achieved, such as a series of centrifugal separators.

The detector means may be any appropriate conventional instrument for measuring the concentration or amount of said selected substance. Such a detector may comprise one or more measuring cells of various kinds adapted to the particular substance or substances to be tested, e.g. a cell for radiometric detection of alpha, beta or gamma radiation (which may be used in the recovery or separation of radioactive substances or in measuring certain nonactive substances labeled with an active isotope), a resistance cell for measuring electric conductivity, an optic cell for colorimetric, spectrometric, spectrophotometric, refractive index measuring or the like, a cell for measuring the dielectric constant. The measuring cells are preferably exchangeable.

In addition to the detector proper the apparatus should preferably be provided with means for measuring other parameters, such as temperature and pH.

It is possible, of course, to evaluate the data obtained from the detector "manually," i.e. to read the values and record them by hand, calculate the partition factor and relate it to other parameters obtained by the apparatus, or in other ways. However, in a more advanced embodiment of the invention the apparatus comprises a detector including a signal output member, such as a transmitter, and an actuator including a receptor connected to said signal output member and responsive to signals from the signal output member. The actuator, according to the purpose of the measuring, may be a recorder, a computer, a regulator member controlling a process or the like. It will be understood that these signal members, which may be equipped with more or less complicated electronic equipments may be of conventional nature and need not be described here.

Figure 2:
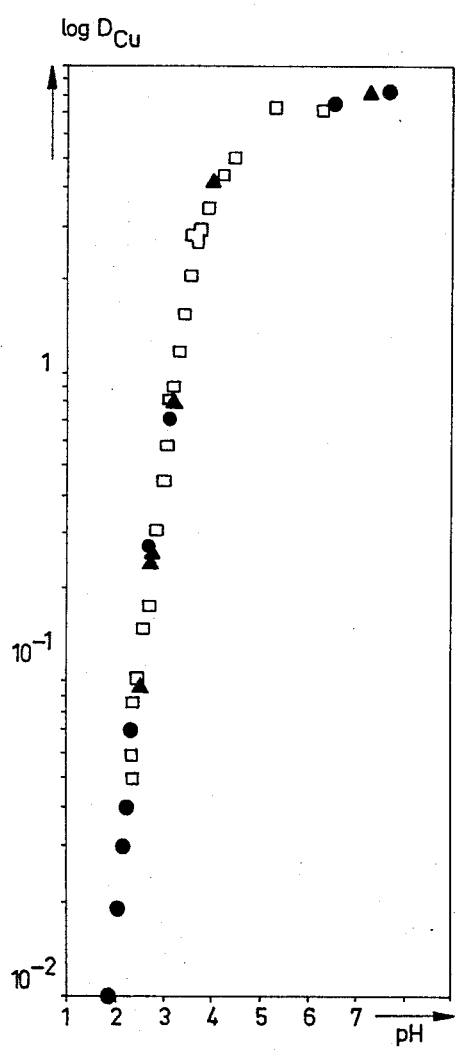
Figure 3:
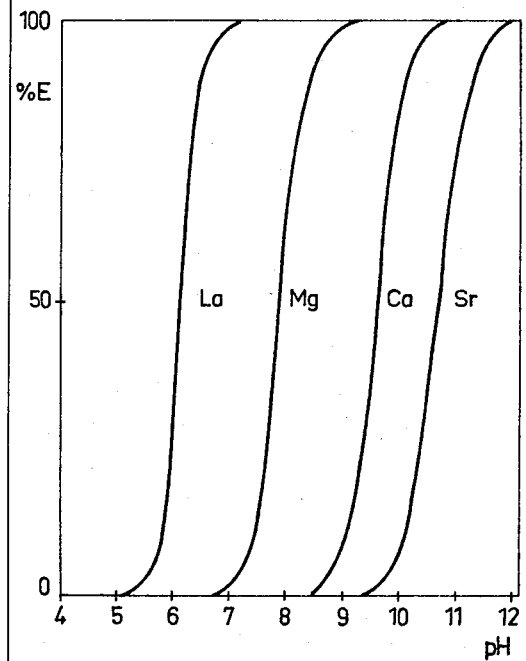

The invention will now be described in more detail with reference to a nonlimitative embodiment of apparatus and examples of execution illustrated in the attached drawing, in which FIG. 1 is a flowsheet illustrating the various units of an apparatus according to the invention and FIGS. 2 and 3 are curve diagrams showing the distribution of some metals as function of pH in a two-phase system obtained by an apparatus as shown in FIG. 1.

The apparatus shown in FIG. 1 comprises a mixture vessel in form of a mixer 1, in which the liquid phases are intimately mixed by the agitator 3, driven by a motor 4. The mixer is connected with a centrifugal separator 7 by a pipe 8 connecting the outlet 9 of the mixer with the inlet 10 of the separator, the pipe 8 being provided with a feed-regulating valve 11. The separator has one upper outlet 13, preferably for the light phase, and one lower outlet 15 preferably for the heavy phase. Outlet 13 is connected to the detector 17 by a pipe 19 containing a flowmeter 21 and a three-way valve 23, by which liquid can be passed through branch pipe 25 to the measuring device or cell 27 of the detector 17 and from there further to the measuring device 29, which may contain a pH electrode 30 and a thermometer 31. The liquid having passed the detector and its accessory elements may be discarded but is, in the apparatus illustrated, recycled to pipe 19 through branch pipe 33. At least in research apparatus the liquid separated is recycled to the mixer 1. Since the liquid is heated by the friction in the separator and possibly in the mixer, it should be cooled so as to maintain constant temperature in the mixer 1. Therefore pipe 19 is attached to a heat exchanger 35 which is in turn connected to one inlet 5 to the mixer through pipe 37. In the embodiment shown the bottom outlet 15 of the separator is connected to a detector and recycling system identical to that described with reference to the phase discharged through outlet 13.

The mixer 1 is additionally connected to a supplier 39 through pipe 41 for some chemical to influence the distribution factor.

It is to be understood that FIG. 1 may illustrate also a process control arrangement according to the invention, the mixer 1 then representing the processing vessel or a special mixer attached to such processing vessel.

The signals from the detector 17 and the accessory measuring means 29 are conveyed by electrical conduits 43 and 45, respectively, to an actuator in the form of, for instance, a recording or a computing device, not shown, which may produce prints or curves representing the phenomena studied. The actuator may, alternatively, be designed to transmit impulses based on the signals from the detector arrangement, to the supplier 39 by way of conduits 47, thereby giving rise to automatic supply in accordance with the output signals from the detectors, which is practical in industrial application of the invention. In the case of pure research work on the influence of some chemical factor on the partition factor, the chemical substance can be supplied by hand in desired amount through supply member 39.

From the great variety of situations to which this invention can be applied only the following examples will be recited as illustrative. The distribution factor D indicates the quotient obtained by dividing the concentration in the organic phase with that in the aqueous phase.

Example 1.

Extraction of copper from an aqueous solution with benzene-acetylacetone as a function of pH.

The distribution factor $D_{Cu}$ of copper containing trace amounts of the radioactive isotope $64_{Cu}$ (on which the measurements were made) between a 0.1 M $NaNO_3$ aqueous phase and a benzene phase containing 0.1 M acetylacetone was ascertained at different pH established by addition of adequate quantities of nitric acid. Equal volumes of the phases were supplied to the mixer 1 of an apparatus according to FIG. 1 and thoroughly mixed therein. By opening the valve 11 the mixture was allowed to flow gently into separator 7 (a specimen according to U.S. Pat. No. 3,442,445 to be separated into two absolutely pure phases, the aqueous phase leaving at outlet 15 and the organic phase at outlet 13. The pure phases were passed to the respective detectors and recycled to the mixer as described above. The concentration of copper in each phase was determined by radiometric means in the detectors and the signals from the measuring units were fed into a computer, designated to render the distribution factor $D_{Cu}$. At the same time pH of the aqueous phase was measured. The value was plotted on a diagram as shown in FIG. 2. During the operation of the apparatus a small amount of alkali was added to the mixer through the supplier 39. When the new pH had become stable, which could be ascertained from the pH electrode 30, the output of the computer was read and the corresponding $D_{Cu}$ obtained, and a new value was plotted on the diagram. The experiment was continued until the dotted curve shown in FIG. 2 was achieved which took only 30 minutes. The different marks in the curve indicate results obtained by first adding alkali, thus increasing pH; (filled circles● ), then adding acid thus decreasing pH (open squares □) and finally adding alkali again (filled triangles▲).

With conventional techniques about 50 test tube experiments would have to be made requiring several days of laboratory work. From the curve in FIG. 2 useful conclusions can be drawn about the copper species in the aqueous and organic phases.

Example 2.

Investigation of the partition factors in a chloroform-water system to be used for the separation of Mg and Sr.

The experiment is carried out with radioactive isotopes of the metals to be investigated. The concentrations of the metals can then easily be ascertained by radioactivity detectors known in the art. It is even possible to test more metals at the same time provided the individual metals emit different kinds of radiation. An aqueous solution of the metal (or metals) is intimately mixed with chloroform containing about 1 percent by weight of the complex former oxine, (8-hydroxyquinoline) the phases being preferably in equal portions, in the mixer 1 of an apparatus of the type illustrated in FIG. 1. After equilibrium is reached the mixture is passed to the separator 7 and the completely separated phases are tested in the detectors 17, the aqueous phase also being tested by the pH instrument 30, and the phases are returned to the mixer 1. The detectors 17 feed their measured values to a computer comprising a double rate meter with the logical function to render the logarithm for the partition or distribution factor $D_{Mg}$ and $D_{Sr}$, respectively. The values obtained, namely log D and pH, are fed to one each of the entrances of an X–Y-recorder. During the experiment acid or alkali is added to the mixer 1, whereby pH of the aqueous phase is changed intermittently or continuously, and the values transmitted from the detectors and pH-measuring device are received by the computer and the X–Y-recorder so that the values of log D and pH are successively plotted on the record produced by the recorder, a record similar to that given in FIG. 2. In the experiment carried out one starts with an aqueous solution having, e.g., a pH corresponding to 0.1 M nitric acid and the pH is changed by successively adding NaOH.

Since in, for instance, technological application the value log D is often impractical the computer may be set to produce instead the extraction percentages of the substances, E percent $=D:(1+D)$. FIG. 3 illustrates the curves obtained in this way for the metals $L^{3+}$, $Mg^{2+}$ of Mg $Ca^{2+}$, and $Sr^{2+}$, tested individually or two or more simultaneously.

It is obvious that curves of this kind are highly useful not only for industrial purposes but also for analysis. Thus, extraction carried out at pH 9 will give an extraction of more than 99 percent Mg but less than 1 percent of Sr in the organic phase.

Example 3.

Extraction of beryllium from ore in the hydrometallurgical industry.

Crushed beryllium ore is leached with sulfuric acid, and the leached solution is subjected to extraction with an organic solvent, in this case kerosene (aromatic or aliphatic) having a quantity of an extraction-promoting organic substance dissolved therein, namely di-2-ethylhexyl phosphoric acid or an organic long-chain primary amine. The recovery of beryllium is carried out in a mixer-settler battery of the type used in hydrometallurgy. The two phases are intimately mixed in a mixer and passed continuously to a settler through a conduit. Separation takes place in the settler through gravity, but it is, of course, possible to use a centrifugal separator if desired. The organic phase is passed to another mixer, and the aqueous phase is usually recirculated to the extraction step. An aqueous stripping liquid may then be sufficiently intimately mixed in a mixer with the organic phase obtained from said settler and the aqueous phase separated for the recovery of beryllium.

The distribution factor $D_{Be}$ of beryllium between the organic solvent and the aqueous phase depends on beryllium concentration, sulfate concentration, pH, concentration of other constituents of the ore (Al, Fe, F etc.), concentration of the extraction promotor, contact time and temperature. Although laboratory experiments on solutions of relatively pure metals or even the particular ore used may indicate, in a manner as illustrated in the example 2, optimum distribution of beryllium at given working conditions, it is hardly possible to calculate the optimum conditions in each of a large number of mixer-settler stages where the working conditions vary normally from stage to stage and may vary occasionally through inadvertently occurring variations in the working condition and in the composition of the ore used. Therefore, for an economical and effective extraction the distribution factor should be observed in each stage continuously or at adequate intervals. This can be achieved in accordance with the present invention.

In using an apparatus according to FIG. 1 modified within the scope of the invention to suit a mixer-settler process, mixer 1 may represent the mixer of the mixer-settler unit or the conduit between the mixer and the settler. A sample is taken out, continuously or at intervals, passed through the separator 7 and the phases are tested as the contents of beryllium and, if desired, other substances, and the aqueous phase also with regard to pH. Each pulse being free of entrainments of the other phase through the absolute phase separation, the values obtained are absolutely true so far. The temperature is also controlled in the liquids tested. The beryllium concentrations in the phases being continuously measured, e.g. spectrophotometrically, the value of the distribution factor $D_{Be}$ is immediately obtained from the measuring units, and thus the factor $D_{Be}$ is instantaneously determined. The conditions in the individual mixer can then be immediately adjusted by adequate variation of the composition of the aqueous or organic phase supplied to the mixer or by adequate additions thereto. This can be made by hand or preferably by an impulse member responsive to the measured values, as via the computer, so as to obtain a more advantageous distribution factor $D_{Be}$ in each individual stage of the mixer-settler battery.

Obviously, this control can be used in the stripping stages as well as extraction stages, a high factor $D_{Be}$ (organic:aqueous) being desirable in the extraction stages and a low factor $D_{Be}$ in the stripping stages where the beryllium value is stripped from the organic solution by an aqueous solution.

It is a great advantage with the present invention that the distribution or partition factor can be determined to the substance in question directly, which is of great importance in process control where it is desired to obtain results accurately, rapidly and continuously, which is not possible by indirect measuring by, for instance, pH.

What we claim is:

1. The method of investigating and controlling a two-phase liquid system, comprising
    continuously introducing substantially immiscible liquids into a confined zone in the presence of a substance to be tested;
    continuously and intimately mixing said liquids and said substance to be tested;
    continuously removing said intimately mixed liquids and substance to be tested from said confined zone;
    rapidly and continuously and completely separating said liquids to provide separate streams of said separated liquids;
    testing each of said streams to measure a property of said substance to be tested present in each stream; and recycling said streams to said confined zone after testing, whereby the distribution of said substance to be tested between said liquids will reach an equilibrium value.

2. The method of claim 1, further including the step of introducing into said confined zone said substance to be tested and regulating the introduction of said substance in accordance with the results of said testing step.

3. The method of claim 1, wherein said testing is continuous to provide a continuous indication of the distribution of said substance in each of said streams.